Figure 1:
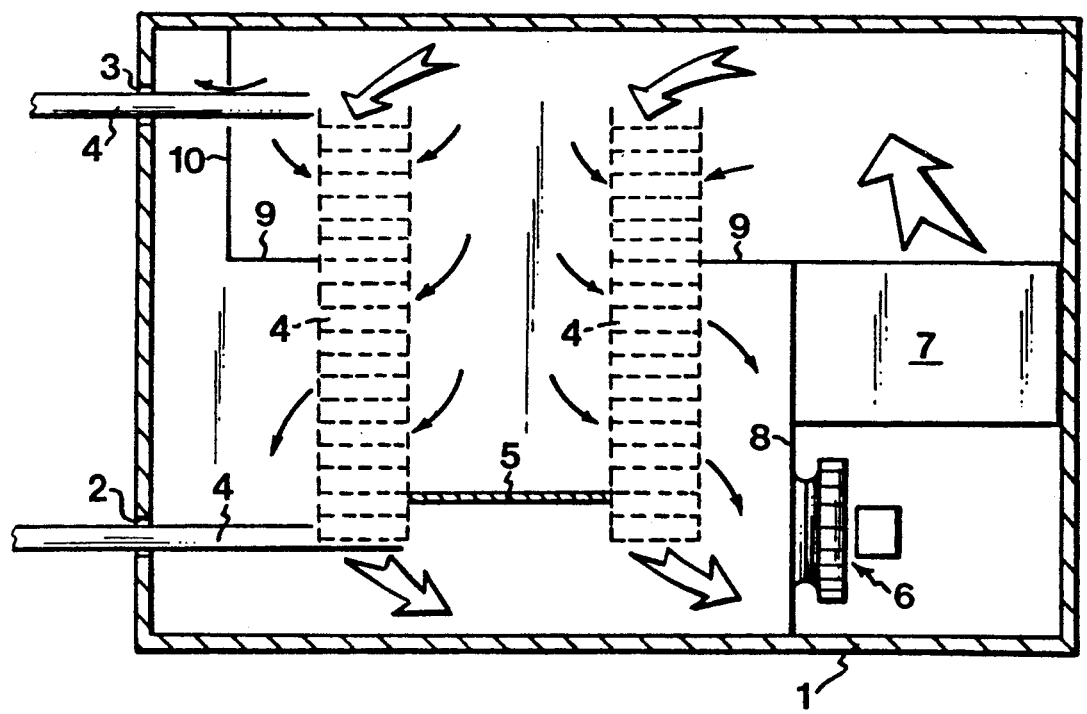

United States Patent [19]

Jaxmar

[11] Patent Number: 5,226,295
[45] Date of Patent: Jul. 13, 1993

[54] AIR TREATMENT PLANT AND METHOD FOR BALANCING PRESSURE DIFFERENCES IN SUCH A PLANT

[75] Inventor: Leif Jaxmar, Vallåkra, Sweden

[73] Assignee: Frigoscandia Food Process Systems Aktiebolag, Helsingborg, Sweden

[21] Appl. No.: 777,318

[22] PCT Filed: May 30, 1990

[86] PCT No.: PCT/SE90/00363
§ 371 Date: Dec. 2, 1991
§ 102(e) Date: Dec. 2, 1991

[87] PCT Pub. No.: WO90/15294
PCT Pub. Date: Dec. 13, 1990

[30] Foreign Application Priority Data

May 31, 1989 [SE] Sweden ................ 8901949

[51] Int. Cl.⁵ .................. F25D 17/06; F24F 9/00
[52] U.S. Cl. .................. 62/378; 62/266; 454/193
[58] Field of Search .......... 62/265, 266, 378, 380; 454/191, 192, 193

[56] References Cited

U.S. PATENT DOCUMENTS

| | | | |
|---|---|---|---|
| 1,981,298 | 11/1934 | Banta | 62/266 |
| 3,203,337 | 8/1965 | Beckwith | 454/193 |
| 3,282,067 | 11/1966 | Dreksler et al. | 62/266 |
| 3,293,879 | 12/1966 | Van Eikeren | 62/266 |
| 3,299,659 | 1/1967 | Dreksler et al. | 62/266 |
| 3,315,492 | 4/1967 | Dreksler | 62/381 |
| 3,645,191 | 2/1972 | Asker et al. | 454/192 |
| 3,943,836 | 3/1976 | Kuechler | 454/191 |
| 4,265,096 | 5/1981 | Andersson | 62/380 |
| 4,696,226 | 9/1987 | Witmer | 454/191 |
| 4,813,245 | 3/1989 | Hubert et al. | 62/380 |

FOREIGN PATENT DOCUMENTS 1241850 6/1967 Fed. Rep. of Germany.

OTHER PUBLICATIONS

Derwent's abstract No. 822 09 B/45, SU 648 800, Publ. week 7945 (Air Gas Turbo Cool).

*Primary Examiner*—Albert J. Makay
*Assistant Examiner*—William C. Doerrler
*Attorney, Agent, or Firm*—Browdy and Neimark

[57] ABSTRACT

An air treatment plant comprises a housing (1); a conveyor (4) adapted to feed food to be processed through an inlet opening (2) in the housing, to and through an air treatment area, and to feed the processed food from this area to and through an outlet opening (3) in the housing; a heat exchanger; and a circulation fan for generating a circulating air flow through the heat exchanger, the air treatment area, and the circulation fan in succession. A pressure regulating fan (25) is connected to a chamber (33) adjacent to one of the inlet and outlet openings (2, 3) for generating a pressure difference across that opening substantially equal to that across the other opening, thus minimizing the air exchange between the interior and the exterior of the housing (1). The conveyor (4) inwardly of this one opening passes a tunnel with at least two air curtain ducts which are directed substantially transversely of the conveyor path and through which some of the circulating air flows.

12 Claims, 2 Drawing Sheets

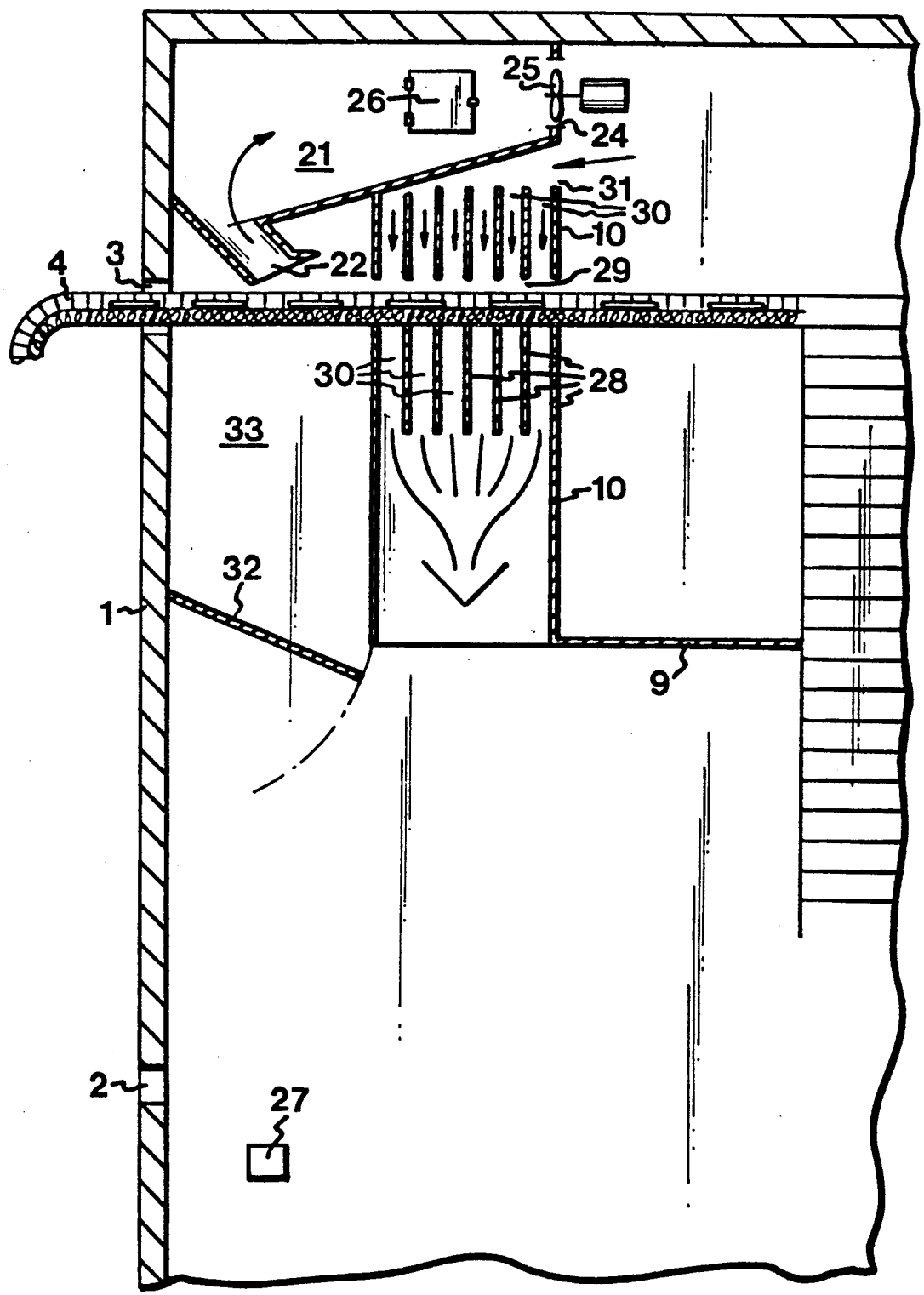
FIG._3

AIR TREATMENT PLANT AND METHOD FOR BALANCING PRESSURE DIFFERENCES IN SUCH A PLANT

The present invention relates to an air treatment plant comprising a housing; a conveyor adapted to feed food to be processed through an inlet opening in said housing, to and through an air treatment area, and to feed the processed food from said area to and through an outlet opening in said housing; a heat exchanger; and a circulation fan for generating a circulating air flow through the heat exchanger, the air treatment area, and the circulation fan in succession.

The invention also concerns a method for balancing pressure differences in such a plant.

It is the fan in such air treatment plants that generates the requisite pressure increase for driving the air flow through the heat exchanger and the air treatment area. Thus, there is, within this area, a pressure drop in the direction of the air flow, resulting in a high-pressure side and a low-pressure side. This pressure drop may, for instance, be in the order of 20-50 mm water column.

For optimum operation of an air treatment plant, it is desirable that the air exchange between the plant and the ambient atmosphere is minimised. This means that there should be about the same pressure difference across the inlet and outlet openings, regardless of whether the ambient pressure outwardly of the two openings is the same, which it usually is, or differs, for example because the plant extends through a partition or outer wall of a building where the pressure is different on the two sides of the wall.

Different pressure differences across the inlet and outlet openings give rise, in a greater or less degree, to air flows through these openings. Naturally enough, such air flows are undesirable since they entail energy losses resulting in that the plant does not function optimally. In a refrigerating plant, they further cause warm air to find its way into the plant and generate frost on the heat exchanger (cooler battery) as well as cold air to escape from the plant and discomfort the operating staff.

The pressure differences may be static or dynamic, or a combination of both. If the pressure difference is exclusively dynamic, an undesiredly strong air current towards the outlet opening may arise.

To avoid different pressure differences across the inlet and outlet openings, the path of the circulating air flow, especially through the air treatment area, has hitherto in the greatest possible degree been separate from these openings. Such an arrangement is, however, not entirely satisfactory. Also, the situation is aggravated when the pressure drop within the air treatment area is increased, which, for instance, may be the case when the capacity of the air treatment plant is augmented owing to an increase of the air flow.

The object of the present invention is, therefore, to provide an air treatment plant of the type stated in the introduction to this specification, which in all essentials eliminates air flows through the inlet and outlet openings of the plant.

Another object of the invention is to provide a method to be used in such plants for balancing pressure differences across the inlet and outlet openings of the housing, thus minimising the air flow through these openings.

According to the invention, these objects are achieved by an air treatment plant of the type stated in the introduction to this specification, which is characterised by a pressure regulating fan which is connected to a chamber adjacent to one of the inlet and outlet openings for generating a pressure difference across said one opening substantially equal to that across the other opening, thus minimising the air exchange between the interior and the exterior of the housing.

According to a second aspect of the invention, the above objects are achieved by means of an air treatment plant of the type stated in the introduction to this specification, which is characterised in that a tunnel surrounding a portion of the path of the conveyor is provided inwardly of a first of the openings of the housing, and that at least two air curtain ducts, which are directed substantially transversely of said portion of the conveyor path and through which some of the circulating air flows, are connected to two opposing sides of the tunnel.

Naturally, the two aspects of the invention can be combined with one another.

Suitably, the pressure regulating fan is an evacuation fan mounted in a duct which is arranged on the inside of the housing and whose inlet opens in the chamber adjacent to said one opening. In that case, an adjustable bypass valve may be arranged in a wall of said duct, between the inlet thereof and the evacuation fan.

Finally, an air flow throttle forming part of the boundary surface of the chamber may be arranged adjacent to at least said one opening.

According to the invention, pressure differences are, furthermore, balanced in a housing of an air treatment plant which, in addition to said housing, comprises a conveyor adapted to feed food to be processed through an inlet opening in said housing, to and through an air treatment area, and to feed the processed food from said area to and through an outlet opening in said housing; a heat exchanger; and a circulation fan for generating a circulating air flow through the heat exchanger, the air treatment area, and the circulation fan in succession, by generating a substantially equal pressure difference across both the inlet and outlet openings by means of a pressure regulating fan connected to a chamber adjacent to one of said openings. According to yet another aspect of the invention, this method is characterised by directing at least two air curtains substantially transversely of the path of the conveyor inwardly of a first of the openings of said housing, some of the circulating air flow being used for this purpose.

Thus, the invention is generally usable in air treatment plants of the type stated in the introduction to this specification, regardless of whether the food is to be heated or cooled. However, the invention is especially suitable for refrigerating plants in which the conveyor comprises a conveyor belt which, in the air treatment area where refrigeration then occurs, is conducted in a helical path, and in which the heat exchanger naturally is a cooler battery.

Figure 2:
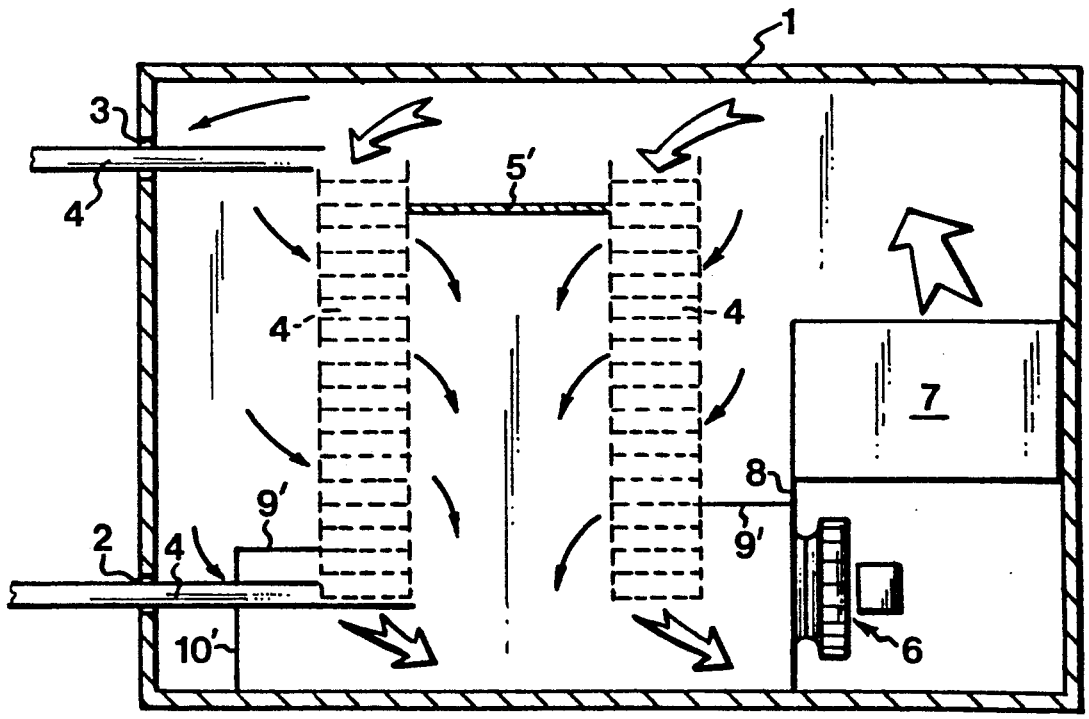

The invention will be described in more detail below, reference being had to the accompanying drawings, in which FIGS. 1 and 2 are schematic cross-sections of two prior art refrigerating plants to which the invention is applicable, and FIG. 3 illustrates an embodiment of the invention applied to the refrigerating plant in FIG. 1.

The refrigerating plant shown in FIG. 1 comprises a housing 1 with an inlet opening 2 and an outlet opening 3. The interior of the housing 1 can communicate with the surrounding atmosphere only via these openings 2 and 3. A conveyor consists of a conveyor belt 4 and a supporting structure (not shown). The conveyor belt 4 passes through the inlet opening 2 to the centre of the housing 1 where it takes a helical path up through said housing 1 which it leaves through the outlet opening 3. The conveyor belt 4 is endless, and its return path from the outlet opening 3 to the inlet opening 2 on the outside of the housing 1 is not shown. Owing to its helical path inside the housing 1, a drum-shaped belt pile is formed, which has a central through opening which, at its bottom, is closed by means of metal sheet 5.

In addition, the housing 1 contains a circulation fan 6, a cooler battery 7, and partitions 8, 9 and 10. In operation, the fan 6 generates a circulating air flow through the cooler battery 7, the belt pile and itself, as is indicated by arrows. The belt pile, through which the circulating air flows, defines an air treatment area for the food carried on the conveyor belt 4. The metal sheet 5 and the partitions 9 and 10 force the air to flow through the belt pile and essentially prevent it from escaping through the outlet opening 3.

In the refrigerating plant shown in FIG. 1, the pressure between the fan 6 and the cooler battery 7 is much higher than the ambient pressure, the pressure between the cooler battery and the belt pile is higher than the ambient pressure, and the pressure in the remainder of the housing, e.g. inwardly of the inlet and outlet openings 2 and 3, just about equals the ambient pressure.

The embodiment shown in FIG. 2 of a prior art refrigerating plant corresponds to the embodiment in FIG. 1, with the exception of the positions of the metal sheet 5' and the partitions 9' and 10'. Owing to these dissimilarities, the pressure between the fan 6 and the cooler battery 7 is, in the embodiment in FIG. 2, higher than the ambient pressure, the pressure between the cooling-coil battery 7 and the belt pile is substantially equal to the ambient pressure, and the pressure between the belt pile and the fan 6 is lower than the ambient pressure. Also in this case, the pressure inwardly of the inlet and outlet openings is substantially equal to the ambient pressure.

However, owing to the practical construction of refrigerating plants of the type shown in FIGS. 1 and 2, there are, in a greater or less degree, considerable pressure differences across the inlet opening 2 and/or the outlet opening 3. So as not to generate air flows through the inlet and outlet openings 2, 3, these pressure differences must be of essentially the same magnitude. The present invention provides such a balancing of the pressure differences, for example as shown in FIG. 3.

As shown in FIG. 3, which corresponds to the upper left portion of the refrigerating plant in FIG. 1, an air duct 21 is arranged inwardly of the outlet opening 3. This air duct has an inlet 22 opening immediately inwardly of the outlet opening 3 and above the conveyor belt 4. Furthermore, the duct 21 has an outlet 24 in which is mounted an evacuation fan 25. The outlet 24 is arranged at a distance from the outlet opening 3 in an area of the housing 1 where the pressure, in this case, is higher than the ambient pressure. A by-pass valve 26 in the form of an adjustable door is arranged in a wall of the duct 21. Thus, the duct 21 extends at least to the partition 10 in which the outlet 24 can be formed.

With the above arrangement, a pressure difference across the inlet opening can, if the pressure inwardly of said opening is lower than the ambient pressure, be balanced by means of the evacuation fan 25 which, by evacuating air from the area outwardly of the inlet 22, reduces the pressure in this area, such that a pressure difference is generated across the outlet opening 3, said pressure difference being substantially equal to the pressure difference across the inlet opening 2.

The pressure difference across the outlet opening 3 can be made to follow the pressure difference across the inlet opening 2 by varying the opening area of the by-pass valve 26. Alternatively, the capacity of the evacuation fan 25 can be varied to achieve this end. The output signal from a pressure transducer 27 arranged inwardly of the inlet opening 2 may, for example, be used as control variable, but the varying may advantageously be carried out by hand as well.

According to the invention, two or more air curtains may serve as an alternative or complement to the evacuation fan 25. The air curtains are directed substantially transversely of the path of the conveyor belt 4 inwardly of the outlet opening 3. The air curtains are produced by a plurality of parallel plates 28 having openings aligned with one another for forming a tunnel 29 for the conveyor belt 4 inwardly of the outlet opening 3. Between the plates 28, air curtain ducts 30 are formed whose inlet side is connected with an opening 31 in the partition 10 and whose outlet side ends in the space outwardly of the partition 10. Thus, the air curtain ducts 30 connect the area inwardly of the partition 10, where the pressure is higher than the ambient pressure, with an area outwardly of the partition 10, where the pressure just about equals the ambient pressure. As a consequence, an air flow in the form of air curtains is generated transversely of the path of the conveyor belt 4 inwardly of the outlet opening 3. Hence, air is prevented from flowing along the conveyor belt 4 towards the outlet opening 3, and the pressure inwardly of the outlet opening 3 is reduced, such that the difference in pressure differences across the inlet opening 2 and the outlet opening 3 is reduced. To further prevent any air from flowing through the inlet opening 3, yet other throttles can be arranged, e.g. in the form of a throttle plate 32 inwardly of the outlet opening 3 and below the conveyor belt 4. As indicated in FIG. 3, the throttle plate 32 may be adjustable, i.e. the degree of throttling may be varied.

Owing to the air curtains described above, food carried on the conveyor belt 4 is pressed against the belt and thus prevented from lifting therefrom. To obtain the necessary effect from the air curtains, all the air curtains must not, on any occasion, be blocked by food on the conveyor belt 4. Therefore, the number of air curtains must be at least two, and suitably more. The width of the air curtains must, of course, be such as to permit conveying of different-sized food.

It should be pointed out that the evacuation fan 25, for obtaining the requisite effect, must be capable of lowering the pressure in the area inwardly of the outlet opening 3, for which reason this area must be comparatively closed and form a delimited chamber 33 (see FIG. 3) with a restricted inflow of air.

It goes without saying that the invention is not restricted to the embodiment described above, and that it may be combined with the variant shown in FIG. 2 of a refrigerating plant. Neither is the invention restricted to the described conveyor type, and any suitable conveyor may be used. Furthermore, this invention is not solely adapted to refrigerating plants; it may just as well be used in plants for processing food with hot air. Finally, the sequence fan, heat-exchanger and air treatment area is immaterial.

I claim:

1. Air treatment plant for processing of food, comprising:
   a housing having an air treatment area, an inlet opening and an outlet opening;
   a conveyor adapted to fed food to be processed through the inlet opening, to and through the air treatment area, and to feed processed food from said air treatment area to and through the outlet opening;
   a heat exchanger in said housing;
   a circulation fan in said housing for generating a circulating air flow through the heat exchanger, the air treatment area, and the circulation fan in succession;
   a delimited chamber communicating with one of the inlet and outlet openings and surrounding the conveyor adjacent to said one opening;
   a pressure regulating means for said chamber for regulating the pressure in said chamber so as to generate a pressure difference across said one opening substantially equal to that across the other opening minimize air exchange between the interior and the exterior of said housing, said pressure regulating means comprising a pressure regulating fan, wherein the pressure regulating fan (25) is an evacuation fan mounted in a duct (21) which is arranged on the inside of the housing (1) and whose inlet (22) opens in the chamber (33) adjacent to said one opening.

2. Air treatment plant as claimed in claim 1, characterised by an adjustable by-pass valve (26) which is arranged in a wall of said duct (21), between the inlet (22) thereof and the evacuation fan (25).

3. Air treatment plant as claimed in claim 1, characterised in that an air flow throttle (32) is arranged adjacent to at least said one opening as a part of the boundary surface of the chamber (33).

4. An air treatment plant for processing of food, comprising:
   a housing having an air treatment area, an inlet opening and an outlet opening;
   a conveyor adapted to fed food to be processed through the inlet opening, to and through the air treatment area, and to feed processed food from said air treatment area to and through the outlet opening;
   a heat exchanger in said housing;
   a circulation fan in said housing for generating a circulating air flow through the heat exchanger, the air treatment area, and the circulation fan in succession; and
   means for substantially equalizing pressure differences across said inlet opening and said outlet opening, said means comprising a delimited chamber communicating with one of the inlet and outlet openings and surrounding the conveyor adjacent to said one opening, and a pressure regulating means for said chamber for regulating the pressure in said chamber so as to generate a pressure difference across said one opening substantially equal to that across the other opening to minimize air exchange between the interior and the exterior of said housing, said pressure regulating means comprising a pressure regulating fan.

5. An air treatment plant for processing of food, comprising:
   a housing having an air treatment area, an inlet opening and an outlet opening;
   a conveyor adapted to fed food to be processed through the inlet opening, to and through the air treatment area, and to feed processed food from said air treatment area to and through the outlet opening;
   a heat exchanger in said housing;
   a circulation fan in said housing for generating a circulating air flow through the heat exchanger, the air treatment area, and the circulation fan in succession;
   a delimited chamber communicating with one of the inlet and outlet openings and surrounding the conveyor adjacent to said one opening;
   a pressure regulating means for said chamber for regulating the pressure in said chamber so as to generate a pressure difference across said one opening substantially equal to that across the other opening minimize air exchange between the interior and the exterior of said housing, said pressure regulating means comprising a pressure regulating fan; and
   a tunnel inwardly of said one opening through which tunnel the conveyor passes, said tunnel having at least two air curtain ducts which are directed substantially transversely of said path and through which ducts some of the circulating air flows.

6. An air treatment plant as claimed in claim 4, further comprising a throttle plate in a wall of said chamber.

7. An air treatment plant as claimed in claim 4, further comprising a duct opening into said chamber and communicating with said pressure regulating fan.

8. An air treatment plant for processing of food, comprising:
   a housing having an air treatment area, an inlet opening and an outlet opening;
   a conveyor adapted to feed food to be processed through the inlet opening, to and through the air treatment area, and to feed processed food from said air treatment area to and through the outlet opening;
   a heat exchanger in said housing;
   a circulation fan in said housing for generating a circulating air flow through the heat exchanger, the air treatment area, and the circulation fan in succession;
   a tunnel inwardly of a first one of said openings of the housing, said tunnel surrounding a portion of a path of the conveyor; and
   at least two air curtain ducts connected to opposite sides of the tunnel and directed substantially transversely of said portion of the conveyor path, through which ducts some of the circulating air flows.

9. A method for balancing pressure differences in a housing of an air treatment plant which, in addition to the housing comprises a conveyor adapted to feed food to be processed through an inlet opening in the housing, to and through an air treatment area, and to feed processed food from the air treatment area to and through an outlet opening in the housing; a heat exchanger; and a circulating fan for generating a circulating air flow through the heat exchanger, the air treatment area, and the circulation fan in succession, said method comprising the step of:

generating by means of a pressure regulating fan, such a pressure in a delimited chamber communicating with one of the inlet and outlet openings and surroundings the conveyor adjacent to said one opening, that the pressure differences across both openings are substantially equal.

10. A method for balancing pressure differences in a housing of an air treatment plant which, in addition to the housing, comprises a conveyor adapted to feed food to be processed through an inlet opening in the housing, to and through an air treatment area, and to feed processed food from the air treatment area to and through an outlet opening in the housing; a heat exchanger; and a circulation fan for generating a circulating air flow through the heat exchanger, the air treatment area, and the circulation fan in succession, said method comprising the step of:

directing at least two air curtains substantially transversely of a path of the conveyor inwardly of a first of the openings of said housing and across a tunnel surrounding the conveyor in said path; and using some of the circulating air flow for generating said air curtains.

11. An air treatment plant according to claim 1 further comprising an air flow throttle (32) adjacent said one opening as part of the boundary surface of the chamber (33).

12. An air treatment plant according to claim 2 further comprising an air flow throttle (32) adjacent said one opening as part of the boundary surface of the chamber (33).

* * * * *